Dec. 27, 1932. E. C. RICHARDSON ET AL 1,892,438
MIRROR SUPPORT FOR PROJECTORS
Original Filed Feb. 24, 1931  2 Sheets-Sheet 2
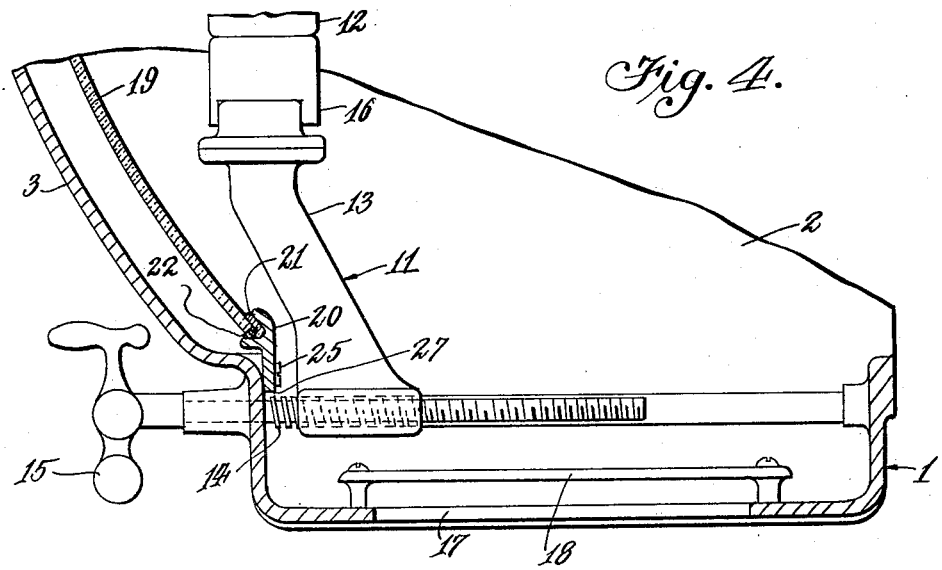
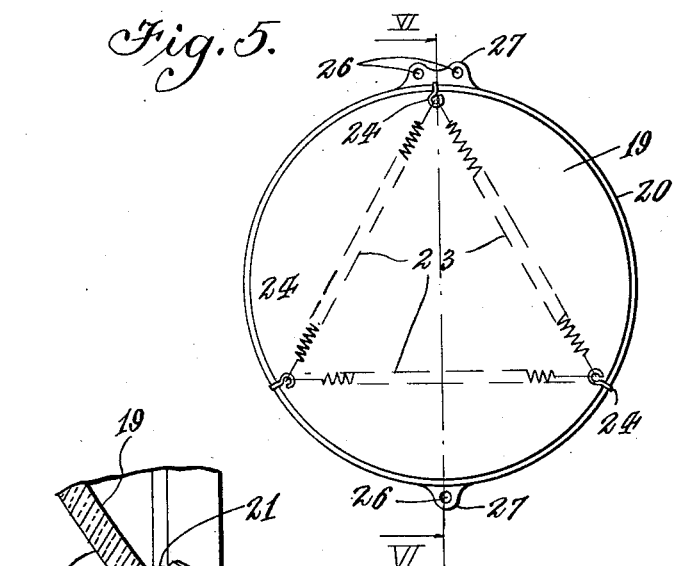
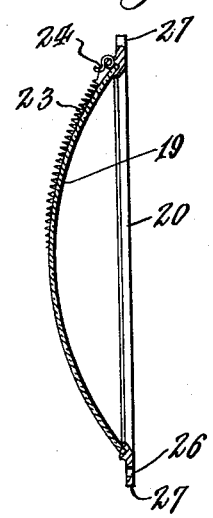
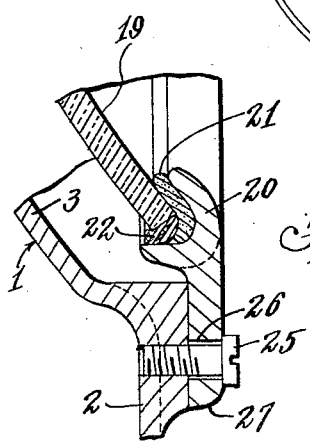
Inventors
Elmer C. Richardson
Peter Mole
By Lyon & Lyon
Attorneys Patented Dec. 27, 1932

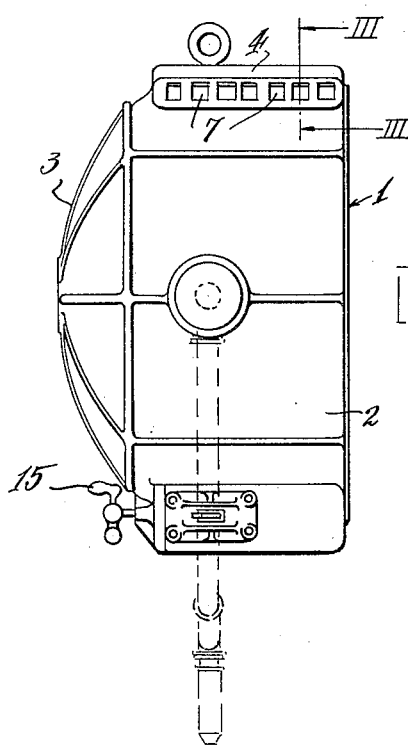
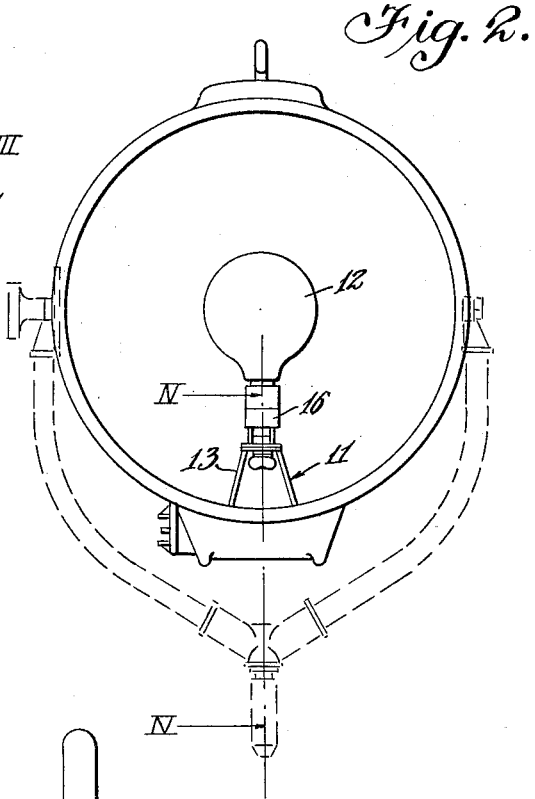
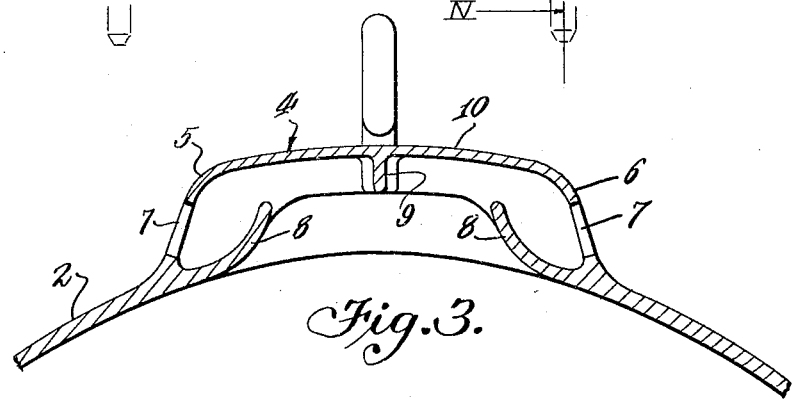

1,892,438

UNITED STATES PATENT OFFICE

ELMER C. RICHARDSON AND PETER MOLE, OF LOS ANGELES, CALIFORNIA, ASSIGNORS TO MOLE-RICHARDSON, INC., OF LOS ANGELES, CALIFORNIA, A CORPORATION OF CALIFORNIA

MIRROR SUPPORT FOR PROJECTORS

Original application filed February 24, 1931, Serial No. 517,738. Divided and this application filed November 24, 1931. Serial No. 576,962.

Our invention relates to light projectors and has particular reference to an illuminating projector to be employed for spot-light and searchlight illumination.

In certain industries, for example, the motion picture industry, it is essential that strong illumination of objects must be obtained, and for this purpose projectors of the searchlight type have been employed using either carbon arcs or high power incandescent lamps as the source of illumination. Either of these types of illumination sources produces a great amount of heat which materially affects the reflector employed in the lamp, causing the same to expand and contract under the influences of great changes in temperature.

An object of our invention is to provide a support for a reflector for an illuminating projector in which the insertion and removal of the reflector may be readily accomplished.

Another object of our invention is to provide a support for a reflector for an illuminating projector in which the supporting strain on the reflector is distributed over a considerable area of the reflector as distinguished from confining the stress to the edges of such reflector.

Other objects of our invention will be apparent from a study of the following specification read in connection with the accompanying drawings, wherein Figure 1 is a side elevational view of an illuminating projector constructed in accordance with our invention;

Figure 2 is a front elevational view of the projector illustrated in Figure 1;

Figure 3 is a detail sectional view taken along line III—III of Figure 1;

Figure 4 is a detail sectional view of our illuminating projector taken along line IV—IV of Figure 2;

Figure 5 is a detail rear elevational view of the mirror or reflector employed with the lamp illustrated in Figures 1 and 2;

Figure 6 is a sectional view of the reflector or mirror support illustrated in Figure 5, the view being taken along line VI—VI of Figure 5, and Figure 7 is a detail sectional view of the reflector support and its manner of mounting in the lamp.

Our invention will be described with reference to an illuminating projector of searchlight type in which the reflector is mounted within a house, more particularly set forth and claimed in our co-pending application, Serial No. 517,738, filed February 24th, 1931, of which this application is a division.

Referring to the drawings, we have illustrated an illuminating projector comprising a housing 1 formed of a substantially cylindrical body portion 2, one end of which is closed by a convex end piece 3. As is illustrated in the drawings, the cylindrical body portion 2 and the end piece 3 are formed integrally with each other.

Upon the uppermost portion of the body member 2 we have illustrated a ventilator 4, this ventilator comprising a box-like protrusion formed upon and extending substantially the length of the cylinder 2, the side walls 5 and 6 joining the box-like protrusion with the main body of the cylinder 2 being provided with a plurality of apertures 7 therethrough to admit air to the interior of the housing 1. To prevent undesirable escape of light through the apertures 7 the wall of the cylinder 2 is preferably extended as is indicated at 8 to form a baffle upon the inner side of the apertures 7, while a central baffle 9 depends downwardly from the top wall 10 of the protruding box-like ventilator structure. It will be observed, however, that the entire ventilator structure is formed integrally with the main body of the lamp housing 1.

At the lowermost portion of the cylinder 2 is a downwardly protruding box-like structure which provides a depressed space in the bottom of the cylinder 2 to accommodate the supporting structure 11 for the source of illumination of lamp 12.

The lamp support may be of any desired character well known in the illuminating projector art and is illustrated herein as comprising a bifurcated standard 13 mounted upon a screw 14 which may be manipulated by a suitable handle 15 mounted upon the exterior of the lamp housing 1. The lamp supporting socket 16 may be mounted upon the standard in any suitable manner to support the lamp 12.

An aperture 17 formed at the bottom of the lower protrusion may be employed as a ventilating opening and is preferably provided with a baffle 18 to prevent undesirable illumination escaping therethrough.

Referring particularly to Figures 4, 5 and 6, it will be observed that a reflector 19 is employed at the rear of the lamp 12, this reflector being preferably formed of a concave mirror of glass or similar material coated with silver or other reflecting metal.

The reflector 19 may be secured to the lamp housing 1 as by means of a reflector supporting ring 20 having a cross sectional configuration of substantially Y-shape, the upper branches of the Y forming a groove into which the front edge of the mirror 19 may be inserted. Contact between the mirror 19 and the supporting ring 20 may be cushioned as by means of suitable cushioning gaskets 21 and 22 inserted therebetween.

The mirror 19 is retained upon its supporting ring by means of a plurality of tension springs 23 extending diagonally across the rear of the mirror preferably in the form of a delta, the ends of each two adjacent springs being supported upon a hook 24, three of which are secured to the supporting ring 20 at equi-distant points around the ring.

The assembled ring 20, mirror 19, springs 23 and hooks 24 may be secured within the lamp housing 1 as by means of bolts 25 extending through openings 26 in extending lugs or ears 27, the bolts 25 being threaded into the metal forming the structure of the housing 1.

The construction herein described constitutes a unitary housing for a lamp and reflector constituting an illuminating projector, the housing absorbing the heat generated by the lamp and expansion and contraction thereof being adequately cared for without the production of noise due to unequal expansion of assembled parts.

The mirror support herein described constitutes a readily accessible supporting device for a mirror or reflector in which the stress supporting weight of the mirror is distributed by means of the springs 23 throughout substantially the entire area of the mirror, thus avoiding excessive strain at any point thereon and permitting substantially unlimited contraction and expansion of the mirror.

While we have illustrated and described the preferred embodiment of our invention, we do not desire to be limited to any of the details shown or described herein, except as defined in the appended claims.

We claim:

1. In a reflector support for illuminating projectors, a concave frangible reflector, a supporting ring having an annular recess therein for receiving the forward edge of said reflector, a plurality of hooks spaced around said ring, and a coil spring secured between each adjacent pair of said hooks and extending across the rear of said reflector.

2. In a reflector support for an illuminating projector, a concave frangible reflector, a supporting ring having an annular recess formed therein to receive the forward edge of said reflector, three hooks secured to the rear side of said ring and spaced around said ring, and a coil spring secured between each adjacent pair of said hooks and extending across the rear of said reflector.

Signed at Los Angeles, California, this 18th day of November, 1931.

ELMER C. RICHARDSON.
PETER MOLE.